United States Patent

[11] 3,624,493

[72] Inventor Joseph R. Gately
Woodside, N.Y.
[21] Appl. No. 13,509
[22] Filed Feb. 24, 1970
[45] Patented Nov. 30, 1971
[73] Assignee Forbro Design Corp.
New York, N.Y.

[54] REGULATED POWER SUPPLY EMPLOYING INTEGRATED CIRCUITS
7 Claims, 3 Drawing Figs.

[52] U.S. Cl. .......... 323/40,
323/75 B, 323/75 N, 323/22 T
[51] Int. Cl. .......... G05f 1/56
[50] Field of Search .......... 323/22 T,
40, 75 B, 75 N, 20

[56] References Cited
UNITED STATES PATENTS

| | | | |
|---|---|---|---|
| 2,561,048 | 7/1951 | Brouwer .......... | 323/75 X N |
| 3,028,538 | 4/1962 | Rosenfeld et al. .......... | 323/22 T |
| 3,275,927 | 9/1966 | Kupferberg .......... | 323/22 T |
| 3,388,317 | 6/1968 | Birman .......... | 323/40 |

*Primary Examiner*—Gerald Goldberg
*Attorney*—Alfred W. Barber

ABSTRACT: A bridge-controlled regulated power supply employs an integrated circuit control amplifier and reference with external circuit additions which improve the current-limiting characteristics, provide protection for the amplifier, uses single control of bridge current and offset zeroing, and automatically cancels noise from the reference voltage zener diode.

INVENTOR.
JOSEPH R. GATELY
BY
Alfred W. Barber
ATTORNEY

INVENTOR

JOSEPH R. GATELY

BY

Alfred W. Barber

ATTORNEY

REGULATED POWER SUPPLY EMPLOYING INTEGRATED CIRCUITS

Until recently, regulated power supplies have used discrete components such as transistors, diodes and zener diodes in reference voltage sources and error or regulating amplifiers. There have been many designs worked out which operate well for the purposes intended. In a way they represented design methods in keeping with the state of the art.

Today, however, a new technology is becoming increasingly important. This is the technology built around integrated circuits. Generally, these integrated circuits offer advantages such as very small size, reliability and low cost but at the same time they have a number of disadvantages particularly in certain areas of performance. Integrated circuit regulators have been produced that are intended to provide fixed output voltages whereas it is often desirable to be able to program the output voltage to zero. Current-limiting provisions of integrated circuits have a soft knee characteristic and are temperature sensitive. These regulators may also be subject to damage from voltage surges produced by the capacitors across the load and voltage control resistors.

SUMMARY

In accordance with the preferred form of the present invention, a regulated power supply which is programmable to zero, has a sharp current-limiting characteristic and other desirable qualities, is built around an integrated circuit regulator. This regulator includes a differential voltage amplifier for voltage regulation which includes two stages of Darlington pair current amplifier stages, two constant current sources and a regulated reference voltage circuit. The two inputs to the differential amplifier are offset by a few volts from the negative return line of the regulator. A current-limiting circuit is provided depending on the base-to-emitter conduction voltage of a transistor.

The regulated power supply in accordance with the present invention uses a bridgelike circuit including a source of reference voltage, a reference resistor for determining the bridge current, a voltage control variable resistor and a pair of output terminals for connection to the load. It has been found that by using a floating auxiliary power supply for supplying the amplifier, reference and current-limiting circuit that a number of important improvements can be made in the characteristics and operation of the regulated power supply.

First, the offset at the two inputs to the error amplifier are provided by dividing the reference current resistor and an auxiliary branch by the same factor, say, in half. One input to the error amplifier is connected to the junction between the two reference current resistors and the other input is connected to the junction between the two resistors forming the auxiliary branch. Since these resistors are chosen proportionally, as set forth below, the two inputs to the error amplifier will be equal under dynamic operating conditions (in accordance with the bridge-regulating theory). It will be seen that under these conditions any noise voltage across the reference voltage source will be equal and opposite at the amplifier inputs and will therefore cancel.

The amplifier drives one or more pass transistors which control the load voltage derived from an unregulated source. The pass transistor or transistors feed the common output terminal through a current-sensing resistor in turn connected to the current-limiting circuit. The offset resistor is connected to the voltage control resistor which in turn is connected to the return side of the unregulated power source. The junction between the offset resistor and the voltage control resistor is automatically at the same potential as the common load terminal and hence a pair of back-to-back protective diodes can be connected between these two points without affecting the normal operation of the regulator circuit. These diodes, however, protect the integrated circuit amplifier from current or voltage surges which can be induced from the capacitor across the load or the capacitor across the voltage control resistor. This is an especially important provision in a high-voltage power supply.

A single variable resistor connected between the reference voltage source and both the reference resistors and the input divider resistors serves to set the bridge current to a precise desired value and at the same time tracks the offset voltages to the two inputs to the amplifier. Setting the bridge current also sets the maximum output voltage of the power supply since the output voltage is equal to the bridge current multiplied by the resistance of the voltage control resistor at any of its settings.

Instead of using the base-to-emitter conduction voltage of a transistor for current limiting, the same transistor is used but as a transistor and it is driven from a differential amplifier which sense the difference between an adjustable reference voltage and the current-dependent voltage drop across the current-sensing resistor. The current-limiting differential amplifier not only provides a much sharper current-limiting characteristic but also provides a considerable degree of immunity to temperature changes due to the inherent temperature compensation in the differential amplifier and the stability of the voltage to which its input is compared.

Figure 1:
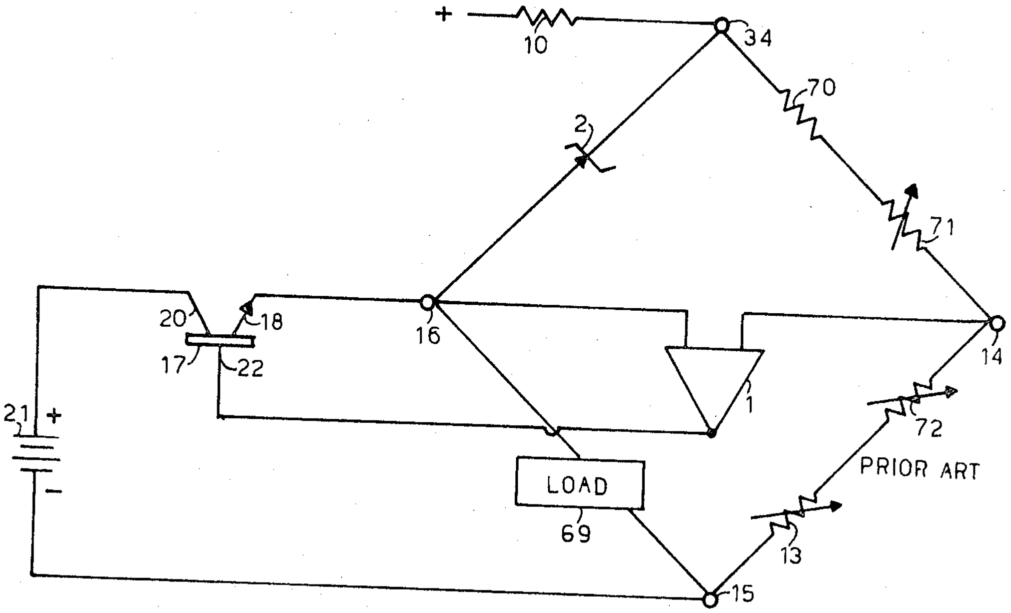
FIG. 1 is a simplified schematic of a prior art bridge-controlled regulated power supply.

FIG. 1 is a simplified schematic of a prior art bridge-controlled power supply. This form of circuit is described in U.S. Pat. No. 3,028,538. The bridge arms are connected to the four bridge terminals 16, 34, 14 and 15. The reference voltage is taken across zener diode 2 supplied with current through a resistor 10 from a suitable source of positive potential, not shown. Zener diode 2 is connected between common terminal 16 and terminal 34. A bridge-current-determining resistor is made up of resistor 70 in series with adjustable resistor 71 and the two in series are connected between terminals 34 and 14. The output voltage control resistor is made up of adjustable resistors 13 and 72 connected in series between terminals 14 and 15. Resistors 71 and 72 are small compared with their associated resistors 70 and 13 respectively and are provided for fine setting of bridge current and zero output voltage respectively. However, these two resistors are mutually dependent in that the adjustment of one changes the required setting of the other. The resulting difficulty in coming to a final setting for each is overcome by the present invention as will be shown below in FIG. 2. The load 69 is connected between terminals 15 and 16. The error or control amplifier 1 is connected between terminals 14 and 16. Pass transistor 17 is connected between unregulated voltage source 21 and common terminal 16 and is controlled by the output of amplifier 1. The unregulated voltage source 21 is returned to terminal 15.

Figure 2:
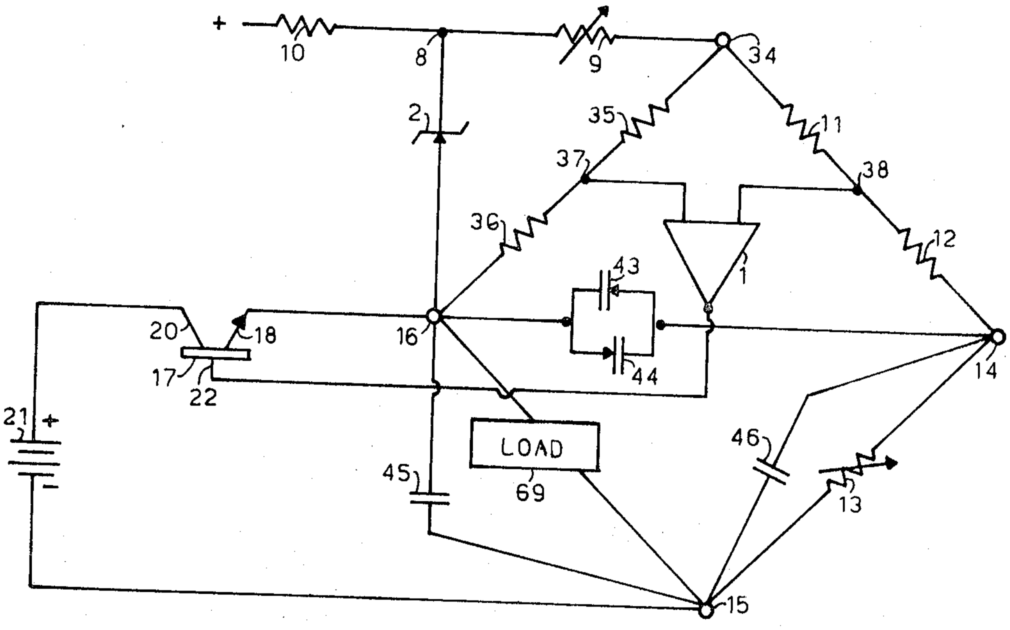
FIG. 2 is a simplified schematic of some of the concepts of the present invention.

FIG. 2 is a simplified schematic showing some of the important aspects of the present invention. Similar parts bear numbers corresponding to those shown in FIG. 1 and described above. In FIG. 2 reference voltage zener diode 2 is coupled to terminal 34 through adjustable resistor 9. Resistors 35 and 36 are connected in series between terminals 16 and 34 while resistors 11 and 12 are connected in series between terminals 34 and 14. The reference voltage for the bridge is the voltage drop across resistors 35 and 36 and this reference voltage is settable by adjustment of resistor 9. The bridge current is equal to this reference voltage divided by the resistance of resistors 11 and 12 in series and hence is simultaneously adjustable by means of resistor 9. The resistors 35, 36, 11 and 12 are precision resistors chosen to satisfy the equation $R_{36}/R_{35}=R_{12}/R_{11}$ This choice makes points 37 and 38 always have the same potential regardless of the setting of resistor 9 and hence are suitable input terminals for amplifier 1. The significant bridge quantity is the bridge current. Thus, when resistor 9 is adjusted to provide the desired bridge current, the input points 37 and 38 to amplifier 1 remain at the same relative potentials and no interdependent adjustments are involved. In addition points 14 and 16 are automatically maintained at the same relative potential so that the two oppositely poled parallel-connected protective diodes 43 and 44 may be connected between points 16 and 14 and will protect the input to amplifier 1 from surges which may arise from charges in load shunt capacitor 45 and voltage control shunt capacitor 46.

Figure 3:
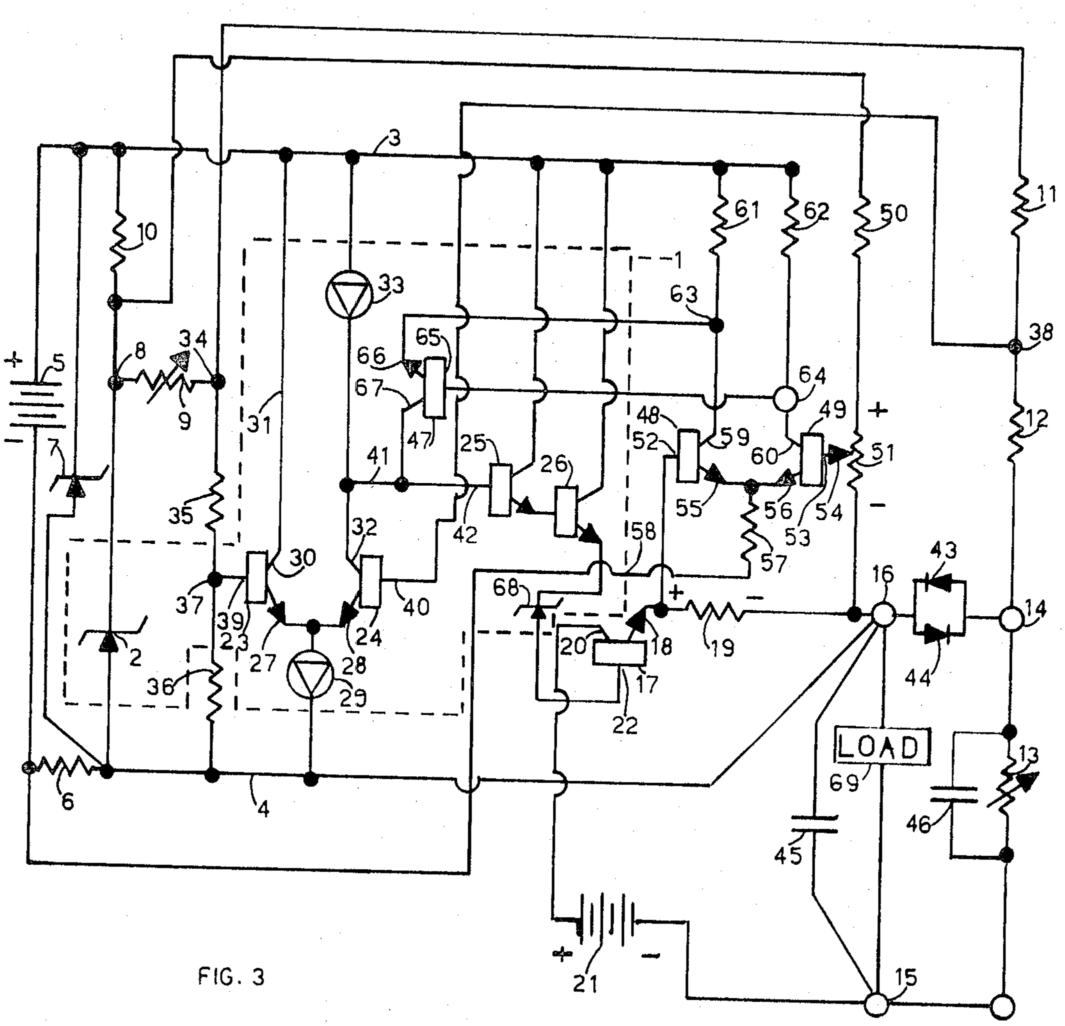
FIG. 3 is a detailed schematic circuit diagram of the preferred form of the present invention.

In FIG. 3 the dotted enclosure may be taken to generally represent an integrated circuit regulator although the reference voltage source is shown as s simple zener diode 2, supplied with current through resistor 10, whereas, in practice it may actually be a rather complex combination of transistors and diodes. The integrated circuit regulator is connected between a positive line 3 and a negative line 4. An auxiliary source of power, here represented for simplicity by battery 5 is floated across lines 3 and 4 with the positive terminal of battery 5 connected to line 3 and negative terminal of battery 5 connected to line 4 through dropping resistor 6. The voltage between lines 3 and 4 is regulated by zener diode 7 connected thereacross.

The control bridge terminals and arms correspond with the simplified drawing of FIG. 2 and corresponding parts bear the same numerals. However, a current-sensing resistor 19 has been added between the emitter 18 of pass transistors 17 and common bridge terminal 16.

The integrated circuit regulator comprises a transistor differential amplifier employing transistors 23 and 24, and two following stages of Darlington-connected transistors 25 and 26. Emitters 27 and 28 are returned to negative line 4 through a constant current regulator represented by the generalized symbol 29. Collector 30 is connected directly to positive line 3 by lead 31 and collector 32 (the output) is returned to positive line 3 through a constant current regulator represented by the generalized symbol 33. The terminal 34 of variable resistor 9 which is connected to reference resistor 11 is also connected to resistors 35 and 36 in series to negative line 4. Now, if resistors 11 and 35 are equal and 12 and 36 are equal, when the bridge is balanced, junction points 37 and 38 will be at the same potential and equally offset from the voltage on negative line 4. For a particular value of reference voltage across zener diode 2, these resistors are chosen so that bases 39 and 40 connected to junction points 37 and 38 respectively are at a predetermined offset voltage. As an example, junction point 34 may be set at +4.74 volts by means of variable resistor 9 and with resistors 11, 12, 35 and 36 all equal to 2.37K, the bridge current will be 1 milliampere and the offset voltages at bases 39 and 40 will both be +2.37 volts at bridge balance. Transistors 23 and 24 form a differential pair. An output taken from collector 32 as over lead 41 is a function of the difference between the voltages applied to bases 39 and 40. By the same token equal voltages applied to bases 39 and 40 tend to cancel at output collector 32. Any noise voltage generated by zener regulator 2 is applied over similar circuits and therefore equally to bases 39 and 40 and hence tends to cancel at output lead 41.

Regulation of the voltage across load terminals 15 and 16 is affected by any unbalance which causes terminal 14 to differ in voltage from common terminal 16 placing a different potential on junction 38 and hence base 40 from the fixed potential at junction 37 and hence base 39. Any unbalance is amplified by differential amplifier transistors 23 and 24, the amplified difference appearing on lead 41 which is connected to base 42 of the first Darlington-connected transistor 25, and in turn drives the Darlington-connected transistor 26 which again, in turn drives base 22 of series pass transistor 17 through zener diode 68 which provides an offset voltage permitting the chain of transistors 24, 25 and 26 to operate suitably above the potential of common terminal 16. The circuit as described so far functions as a voltage regulator and the output voltage is regulated and programmable from the maximum to zero by varying the resistance of voltage control resistor 13.

With resistors 11, 12, 35 and 36 chosen as set forth above, junction points 14 and 16 are automatically at substantially the same potential when the system is operating in a normal manner. Protection of the transistor-amplifier from certain contingencies can be provided by connecting the two back-to-back diodes 43 and 44 between these two points. These diodes will bypass any surge currents which may result from the sudden discharge of capacitor 45 connected between load terminals 15 and 16 or capacitor 46 connected across voltage control resistor 13.

Current limiting may be provided employing as a reference the base-to-emitter conduction voltage of transistor 47 provided in the integrated circuit regulator for this purpose. However, the circuit of the present invention by adding the differential amplifier using transistors 48 and 49 provides a much sharper current-limiting characteristic than is possible with transistor 47 only. The output current of the regulated power supply flows through current-sensing resistor 19 developing a current proportional voltage. A source of comparison voltage is provided by means of a regulated voltage taken across zener diode 2 from point 8 through fixed resistor 50 and potentiometer 51 to common terminal 16. Base 52 of transistor 48 is connected to the end of resistor 19 connected to pass transistor 17 and base 53 is connected to adjustable arm 54 of potentiometer 51 so that the voltage drop across current-sensing resistor 19 is compared with the voltage between arm 54 and common terminal 16. If the voltage across resistor 19 is the greater of the two voltages a feedback signal is produced cutting the output of the control amplifier. Emitters 55 and 56 are returned through common emitter resistor 57 over lead 58 to the negative end of floating auxiliary voltage source 5. The voltage drop provided by resistor 6 makes this return point negative with respect to common terminal 16 so that transistors 48 and 49 are provided with emitter bias. Collectors 59 and 60 are returned to positive line 3 through collector resistors 61 and 62 respectively. Base 65 is connected to a reference point 64, the collector of transistor 49 and resistor 62. Emitter 66 is connected point 63, the junction between collector resistor 61 and collector 59. Collector 67 is connected to base 42 of the first of the Darlington-connected transistors 25. When the output current of the power supply exceeds the current predetermined by the setting of arm 54, the voltage drop across current-sensing resistor 19 exceeds the reference voltage at arm 54 and base 52 becomes more positive than base 53. Transistor 48 goes into conduction pulling the potential of collector 59 and hence emitter 66 in a negative direction. Base 65 becomes positive with respect to emitter 66 and transistor 47 conducts pulling base 42 in a negative direction. This in turn through transistor 26 robs pass transistor 17 of drive and the current to the power supply output is prevented from increasing. The amplification in this current-limiting circuit provided by transistors 48 and 49 provides a very sharp current-limiting characteristic. The point at which current-limiting takes place is variable by varying arm 54 on potentiometer 51.

I claim:

1. In a regulated power supply including a bridge control circuit connected around a four-terminal configuration comprising a first terminal common to one side of a load to be supplied with regulated voltage and a pass transistor connected through a current-sensing resistor, a second terminal connected through an adjustable resistor to a source of bridge current and to one end of a first two series-joined reference resistors, a third terminal connected to the other end of said two reference resistors and one end of an adjustable output voltage control resistor, and a fourth terminal connected to the other end of said voltage control resistor, to the other side of said load, and a source of voltage to be regulated connected between said fourth terminal and said pass transistor;

the improvement which comprises two additional series-joined resistors connected between said first and second terminals wherein the first series and additional two resistors are of predetermined resistance ratio, and an error amplifier including two input terminals and an output terminal means connecting one of said input terminals to the junction between the first said two resistors, means connecting the other of said input terminals to the junction between said additional two resistors, and means for coupling said output terminal to the control element of said pass transistor;

whereby said two input terminals are maintained at substantially the same relative potential in the presence of bridge current adjustments for setting the maximum output made by adjusting the first said adjustable resistor.

2. A regulated power supply as set forth in claim 1;

and including two reverse-directed, parallel-connected protective diodes connected between said first and third terminals for preventing load and voltage control circuit surges from reaching said two input terminals.

3. A regulated power supply as set forth in claim 1;

wherein said error amplifier is an integrated circuit amplifier.

4. A regulated power supply as set forth in claim 1;

and including a single source of voltage coupled to voltage-regulating means and coupled to the bias circuits of said error amplifier.

5. A regulated power supply as set forth in claim 4;

wherein said source of bridge current comprises the voltage drop across said voltage-regulating means.

6. A regulated power supply as set forth in claim 1;

wherein said error amplifier includes an inhibit terminal.

7. A regulated power supply as set forth in claim 6;

and including a differential balanced transistor amplifier for comparing the voltage drop across said current-sensing resistor with a reference voltage and providing an output signal to said inhibit terminal.

* * * * *